M. McNALLEY.
Improvement in Combined Axle Box, Sand Band and Casing for Carriage Wheel-hubs.
No. 122,185.
Patented Dec. 26, 1871.
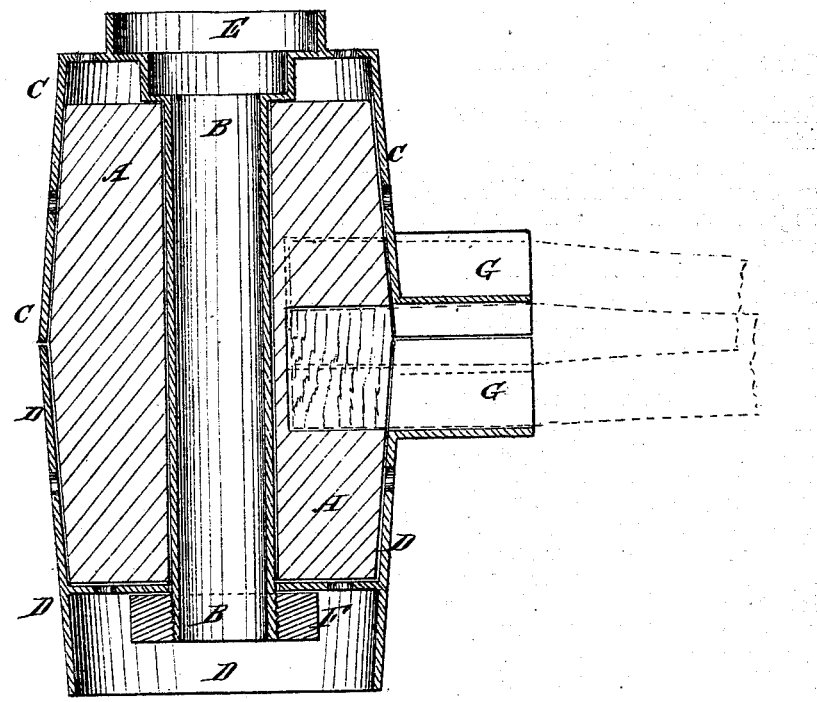
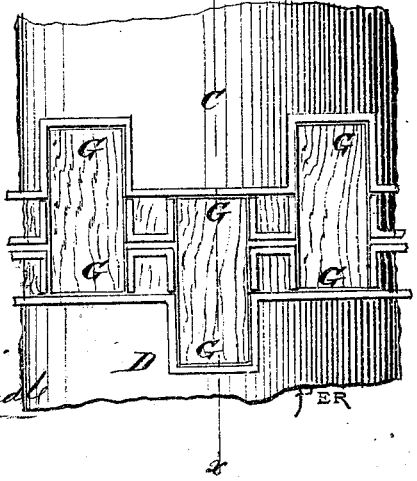

UNITED STATES PATENT OFFICE.

MICHEAL McNALLEY, OF HOUSTON, TEXAS.

IMPROVEMENT IN COMBINED AXLE-BOXES, SAND-BANDS, AND CASINGS FOR CARRIAGE-WHEEL HUBS.

Specification forming part of Letters Patent No. 122,185, dated December 26, 1871.

Specification describing an Improvement in Combined Axle-Box, Sand-Band, and Casing for Carriage-Wheel Hubs, invented by MICHEAL McNALLEY, of Houston, in the county of Harris and State of Texas.

Figure 1 is a detail longitudinal section of my improved hub taken through the line $xx$, Fig. 1. Fig. 2 is a side view of the middle part of the same.

My invention has for its object to furnish an improved cast-iron axle-box, sand-band, and casing to be applied to the wooden hubs of carriage-wheels, which shall be simple in construction, easily applied, neat in appearance, and strong and effective in use; and it consists in the construction and combination of the various parts of the apparatus, as hereinafter more fully described. A represents the wooden hub, through the center of which passes the axle-box B that receives the axle. The rear end of the box B is made with a shoulder or enlargement to receive the collar or shoulder of the axle, and is cast solid with the inner end of the part C of the casing, which part of the said casing is so formed as to fit upon the inner end of the wooden hub A, as shown in Fig. 1. E is the sand-band, which is cast solid upon the end of the part C of the casing. D is the outer part of the casing, which fits upon the outer end of the wooden hub A. The outer end of the part D of the casing is formed with a projecting flange or band to cover and protect the projecting end of the axle. The outer end of the axle-box B projects through a hole in the end of the part D of the casing, and has a screw-thread cut upon it to receive a nut, F, which locks the parts to each other and to the wooden hub A. The parts of the casing may be further secured to the hub A by rivets or screws passing through the ends of the said parts C D and through the said wooden hub A, as indicated by the holes in said casing shown in Fig. 1. The adjacent edges of the parts C D of the casing meet at the middle part of the hub A, as shown in Fig. 1. G are sockets formed upon the parts of the casing to receive the inner ends of the spokes, the tenons of said spokes entering mortises in the wooden hub A in the ordinary manner. The spoke-sockets G are formed partly upon the part C and partly upon the part D of the casing, as shown in Fig. 2, the flanges that form them extending continuously around said parts C D and being made with offsets or ribs to bear against each other between the spokes and thus more strongly support the sides of the spokes and prevent them from breaking off at the shoulder of the tenons.

Having thus described my invention, I claim as new and desire to secure by Letters Patent—

The axle-bar B cast solid with casing C and sand-band E and sockets G, and combined with casing D and nut F, and arranged as shown and described.

MICHEAL McNALLEY.

Witnesses:
THOMAS B. POUNDS,
WILLIAM D. POUNDS. (31)